United States Patent [19]

Page et al.

[11] 4,381,066

[45] Apr. 26, 1983

[54] POLYMERIC FOAM CAULKING COMPOSITIONS

[76] Inventors: Edward H. Page, 1021 Hillcrest Rd., Ridgewood, N.J. 07450; Frank Scotti, 450 Indian Rd., Wayne, N.J. 07470

[21] Appl. No.: 376,570

[22] Filed: May 10, 1982

[51] Int. Cl.³ .............................................. B65D 83/00
[52] U.S. Cl. .................................. 222/394; 252/305; 264/DIG. 5; 521/78; 521/88; 521/89; 521/98; 521/121; 521/149; 521/910; 521/114
[58] Field of Search .................. 222/394; 252/305; 521/78, 88, 89, 98, 121, 149, 910, 114

[56] References Cited

U.S. PATENT DOCUMENTS

| | | | |
|---|---|---|---|
| 2,524,590 | 10/1950 | Boe | 252/305 |
| 3,096,001 | 7/1963 | Boe et al. | 222/135 |
| 3,207,386 | 9/1965 | Presant et al. | 222/394 |
| 3,330,730 | 7/1967 | Hernandez | 167/85 |
| 3,343,718 | 9/1967 | Siegel et al. | 521/78 |
| 3,419,506 | 12/1968 | Gander | 521/78 |
| 3,551,374 | 12/1970 | Reinhard et al. | 525/222 |
| 3,572,330 | 3/1971 | Gander | 521/78 |
| 3,640,916 | 2/1972 | Dill | 260/2.5 L |
| 3,705,669 | 12/1972 | Cox et al. | 521/78 |
| 3,912,665 | 10/1975 | Spitzer et al. | 521/78 |
| 3,912,666 | 10/1975 | Spitzer et al. | 521/78 |
| 3,912,667 | 10/1975 | Spitzer et al. | 521/65 |
| 3,970,584 | 7/1976 | Hart et al. | 252/305 |
| 4,277,387 | 7/1981 | Jordan, Jr. et al. | 260/29.7 H |

FOREIGN PATENT DOCUMENTS 2947999 11/1979 Fed. Rep. of Germany .
2028364 3/1980 United Kingdom .

OTHER PUBLICATIONS

Freon Product Information, *Aerosol Age*, Nov. 1960.
Chem Abstracts, 78,113066e
Chem Abstracts, 85,112657f
Sciara, Aerosol Paint Propellants, *Paint and Varnish Production* (1963).
Bohnenn, Dimethylether Pure, *Aerosol Age*, p. 26, Jan. 1981.
Bohnenn, Dimethylether Pure, Part II, *Aerosol Age*, Feb. 1981.

*Primary Examiner*—Morton Foelak

[57] ABSTRACT

This invention concerns sprayable emulsions of a foamable polymer in water which are useful as aerosol caulking or insulating compositions.

33 Claims, No Drawings

POLYMERIC FOAM CAULKING COMPOSITIONS

BACKGROUND OF THE INVENTION

1. Field of the Invention

This invention relates to foamable polymeric compositions which are especially useful as insulating, caulking and sealing compositions.

2. Description of the Prior Art

Insulating, caulking and sealing compositions are known in this art. These conventional compositions include a wide range of compounds which are used in the construction, manufacturing and transportation industries. These compositions are used to seal joints or voids against water and water vapor, air and other gases, dust, sound, vermin, heat and cold, and to insulate piping and heating systems to prevent heat loss. Specialized applications require resistance to certain chemicals or environments.

One type of caulking composition which has attained widespread popularity is the type based on polymers and mixtures of polymers. For example, U.S. Pat. No. 3,551,374 describes polymeric caulking compositions based on mixtures of polymers of esters of ethylenically unsaturated carboxylic acids having three to five carbon atoms, and alkanols having one to twelve carbon atoms. In general, these caulking and sealing compositions are prepared by melting together the components, by mixing solutions of the polymers, or by mixing suitable monomers with bitumen, tar or pitch and effecting polymerization when these mixtures are used.

These conventional caulking compositions are available in a variety of forms and packages, which are dependent on the form in which the composition is to be applied and its physical properties. For example, they are supplied generally in the form of knife- or gun-grade compositions. The knife-grade materials are the stiffer of the two, and lend themselves to putty-knife application. The gun-grade compositions are extruded through an orifice, using a hand or pressure-operated caulking gun. The use of aqueous polymer dispersions for gunnable or extruded caulking compositions is advantageous because such compositions are more easily applied, and because polymers having special properties are more easily prepared by emulsion polymerization. However, compositions of this type suffer from a number of disadvantages. Normally, these compositions are dispensed from a cartridge through use of a caulking gun. The need for a caulking gun increases the expense of using such compositions. Further, the cartridges in which the compositions are packaged are usually of the type having an enclosed plastic nozzle through which the composition is dispensed. When used, a portion of the plastic nozzle is cut off, forming a dispensing orifice which will dispense caulking composition in a certain ribbon size. This is disadvantageous because while more of the plastic can be cut off to form a larger dispensing orifice which results in a larger ribbon size, the size of the dispensing orifice cannot be restricted. As a result, the ribbon size of the caulking composition cannot be reduced at a later time.

Another disadvantage associated with the use of gunnable aqueous polymeric caulking compositions is that the high water content of the dispersion causes a marked shrinkage of the caulking seals prepared therewith. The composition which initially completely fills a gap later develops a concave surface. Although it is possible to add inorganic fillers to decrease the water content, and consequently to reduce the tendency of the compounds to shrink, the adhesive and cohesive properties of the emusion polymers are in general adversely affected by these additives. Also, when inorganic fillers are used, the viscosity of the caulking composition is increased such that the composition is difficult to use in situations where the composition must be deposited into small cracks.

Still another disadvantage associated with the conventional aqueous polymeric dispersion-based caulking composition is that the viscosity of such compositions is often so low that they cannot be effectively used in overhead situations because of the tendency of the composition to flow. Such properties can be cured by the addition of fillers, which results in the disadvantages discussed above.

Accordingly, there is a need for a polymeric caulking composition that cures the aforementioned disadvantages of the conventional knife and gun-grade compositions. Those of skill in the art have suggested the use of foam polymeric compositions for caulking and insulating.

One drawback of these compositions has been the difficulties associated with preparation of the foamed caulking material. Recently, foamable compositions have been prepared by mixing a polymer and a polymer-soluble inert blowing and propelling agent under pressure in an aerosol container. The blowing agent is usually a generally volatile organic liquid which vaporizes when released from the container, and thereby foams the polymeric material. For example, U.S. Pat. No. 3,640,916 describes foamed caulking and insulating compositions based on a cross-linked acrylic emulsion polymer and in which various hydrocarbons and halogenated hydrocarbons are employed as the blowing and propelling agents. These compositions have not been generally acceptable as caulking compositions because of various disadvantages associated with the physical characteristics of the resulting foam. The principle disadvantage is the expansion ratio of the above-mentioned foamable composition when released from the container. For example, experimentation has shown that these compositions expand to more than six times their volume when foamed with volatile liquid hydrocarbon and/or volatile liquid halogenated hydrocarbon blowing agents. This expansion ratio is so large that a small tight ribbon of foam caulking composition cannot be deposited. Another disadvantage relates to the physical state of the foam. Generally, the consistency of the foamed composition is such that it drips from vertical and overhead surfaces, and the composition is subject to collapse which causes considerable shrinkage of the composition after drying.

Accordingly, there is a need for a foamable caulking composition which obviates the defects of the known caulking compositions.

It is, therefore, an object of this invention to provide a foamable caulking composition which is resistant to environmental factors, and which adheres well and exhibits minimal shrinkage after drying.

It is also an object of this invention to provide an aerosol dispensed caulking composition which can be used in the home or in other like field environments and which can be dispensed in a tight ribbon.

It is yet another object of this invention to provide a foamable caulking composition which can be dispensed from an aerosol container in ribbons of varying sizes.

It is still another object of this invention to provide an aqueous polymeric based caulking composition which can be dispensed in small cracks or crevices.

It is yet another object of this invention to provide a foamable aerosol-dispensed, aqueous, polymer-based composition which forms a foam caulking composition which does not collapse unduly, and which does not drip from overhead or sag on vertical surfaces.

It is still another object of this invention to provide an aerosol container including the caulking composition of this invention, said container being adapted to dispense the composition.

Other objects and advantages will be apparent to one of skill in the art from the following description and appended claims.

SUMMARY OF THE INVENTION

The aforementioned objects are achieved by the present invention which provides a composition which is suitable for preparing a stable cellular foam which is useful as a caulking and sealing composition. The composition of the invention comprises:

an aqueous emulsion of a foamable polymer, a foam forming amount of a mixture of dimethyl ether and a volatile organic liquid compound selected from the group consisting of a volatile hydrocarbon and a volatile halogenated hydrocarbon, wherein the weight ratio of the organic liquid compound to the dimethyl ether is adapted such that the foam is stable in the sense that it does not unduly collapse upon standing; filler and a nonionic surfactant having a hydrophile-lipophile balance (hereinafter HLB) of at least about 15 or above. Further, the volume of the foam produced is not greater than six times the volume of the unfoamed composition of the present invention. Accordingly, these compositions are extremely useful for caulking and sealing because of their stability, and because of the relatively low expansion of the formulation during foam formation which enables the depositing of a narrow ribbon of the cellular foam on a substrate.

In another aspect, this invention relates to a method of caulking and insulating. This method comprises applying to the site to be caulked or insulated an effective amount of the composition of this invention.

Still another aspect of this invention relates to an aerosol container incorporating the compositions of this invention. The container is pressurized and includes various dispensing means which are suitable for dispensing a foam.

The composition enclosed in the container will generally comprise an emulsion of a foamable polymer, a propellent mixture comprising dimethyl ether and a volatile organic liquid consisting of a volatile hydrocarbon or a volatile halogenated hydrocarbon and mixtures thereof; filler and a nonionic surfactant having an HLB of at least about 15. The dimethyl ether and volatile organic liquid will be present in an amount sufficient to foam the composition, and to propel the composition from a pressurized container. Further, the weight ratio of the volatile organic liquid compound to the dimethyl ether is adapted such that the foam is stable and does not completely collapse upon standing over a prolonged period of time.

DESCRIPTION OF THE PREFERRED EMBODIMENTS

The composition of this invention includes an oil-in-water emulsion of a foamable polymer.

Emulsions are generally classified as being either of the water-in-oil type or of the oil-in-water type. In an oil-in-water emulsion, the water is present in the form of small droplets dispersed in a continuous oil phase. U.S. Pat. No. 2,524,590 generally discloses the formulation of sprayable compositions formed by emulsifying a film-forming polymer with a solution of water and a water-soluble propellent gas.

Polymers suitable for use in the compositions of this invention have a weight-average molecular weight in the order of for example from about 100,000 to about 200,000, and preferably have a mean glass transition temperature of less than about 15° C., most preferably less than about −10° C. Foamable polymer as used herein refers to any polymer or combination of polymers which can be emulsified and foamed to form the desired cellular structure when subjected to the action of the gaseous blowing agent. "Mean glass transition temperature" as used herein refers to the average glass transition temperature of the polymer or mixtures of polymers.

Homopolymers and copolymers of aliphatic and aromatic ethylenically unsaturated compounds can be used as the polymer component of the composition of this invention. Illustrative of these compounds are acrylic polymers such as those prepared by the addition polymerization of acrylonitrile, methacrylonitrile, and the like, and the polymers of ethylenically unsaturated carboxylic acid compounds and the corresponding alkyl esters such as the addition polymers of acrylic acid, methacrylic acid, methyl acrylic acid, ethyl acrylic acid, maleic acid, fumaric acid, acid and the like. Preferred acrylate polymers of this class are the n-alkyl acrylates, for example, polybutyl acrylate or polybutyl methacrylate.

Also useful as the polymer component of the foamable polymer component of the composition of this invention are the homopolymers and copolymers of aliphatic and aromatic unsaturated compounds such as polyethylene, polypropylene, polystyrene, polyvinylchloride, polyvinyl acetate, polyisobutylene, polymethylstyrene, vinylidene chloride and the like. Also useful are polyvinyl ether, polyvinyl fluorides, polyisobutylene, polyvinyl pyrrolidine, polyvinyl alcohol as are homopolymers and copolymers having recurring amide and ester linkages. Illustrative of such compounds are Nylon-6, N-methyl Nylon-6, polyethylene orthophthalate, polyethylene terephthalate and the like. Illustrations of other classes of useful polymers are polyalkylene oxides such as polyethylene oxide, polypropylene oxide, and other types of epoxy type resins. The homopolymers and copolymers of 1,4-diene compounds, such as butadiene, 2-chlorobutadiene, isoprene and the like are also useful. Polyurethanes, polysulfides and various urea/formaldehyde based polymers can also be used.

The compositions of this invention may include from about 35 to about 50 weight percent of a preformed aqueous polymer emulsion, based on the total weight of the composition. The resultant composition in turn will preferably include a polymer solids content of from about 15 to about 30 weight percent based on the total weight of the composition. One example of such a polybutylacrylate emulsion is LC-67 (60% solids), which is available from Rohm and Haas Co.

The preformed aqueous polymeric emulsion may itself contain minor amounts of emulsifier. However, the additional amounts of nonionic surfactant which are added are necessary to provide a final emulsified composition which is suitable for the preparation of the foams of this invention, as described hereinbelow.

The compositions of this invention include a nonionic surfactant (emulsifier) having an HLB of about 15 or above. It has been found that nonionic surfactants having HLB values of 15 or above will promote the formation of stable cellular foams which possess adequate self-leveling and vertical cling properties so as to be effective for insulating and caulking applications, when used in the formulations of this invention. The preferred surfactants of this invention promote the production of high-solids concentrates of viscosities of about 12,000 to about 20,000 centipoises (cps). Preferred concentrate viscosities are in the range of 14,000 to 20,000 cps, most preferably 14,000 to 17,000 cps. As used herein "concentrate" refers to the compositions of this invention before admixture of the propellants.

The hydrophile-lipophile balance can be based on either analytical or composition data and for many of the suitable polyhydric alcohol-fatty acid ester emulsifiers can be calculated from the formula, $$HLB = 20(1-S/A) \tag{A}$$

wherein S is the saponification number of the ester and A is acid number of the acid. In those instances where the fatty acid esters do not give good saponification number data, the following formula can be utilized:

$$HLB = (E+P)/5 \tag{B}$$

wherein E is the weight percent of oxyethylene content and P is weight percentage of polyhydric alcohol content (glycerol, sorbitol, etc.). In the emulsifiers wherein only ethylene oxide is used as the hydrophilic portion and for fatty alcohol-ethylene oxide condensation products, the equation B above may be simplified to read as follows:

$$HLB = E/5 \tag{C}$$

wherein E is the percentage of oxyethylene content. A discussion of the calculation of HLB values for various surfactants is provided by Becker, *Emulsions Theory and Practice*, Reinhold Publishing Company (1957), at page 189–199, which is incorporated herein by reference.

Nonionic surfactants are those in which the affinity for water, or hydrophilicity, is due to the presence of nonionizing polar groups. For example, those nonionic surfactants useful in the present invention include alkyl-substituted-phenoxy polyoxyethylene ethanols wherein the alkyl group is at least of seven carbon atoms and the ethanoxy ($-CH_2-CH_2-O-$) groups number at least 15; and alkoxy-polyoxyethylene ethanols wherein the ethanoxy groups number at least 15, and the alkoxy group is at least of eight carbon atoms. When the molar ratio of ethylene oxide which is condensed with the phenol or alcohol in such compounds is 15 or above, the HLB of such surfactants will generally be greater than 15. Nonionic surfactants having HLB values below about 14 will provide foam concentrates of unacceptably high viscosities, while nonionic surfactants having HLB values above about 15 provide concentrates of acceptable viscosities.

Anionic surfactants are not effective in the compositions of this invention. Examples of anionic surfactants are potassium oleate (HLB 20), triethanolamine oleate (HLB 12), sodium lauryl ether sulfate (HLB 45) and sodium lauryl sulfate (HLB 40). Such surfactants lead to concentrates of very high viscosity (greater than 100,000 centipoises) which cannot be completely expelled from aerosol containers using the propellant gasses of this invention at the pressures commonly used for foam expulsion.

The most-preferred ethylene oxide-phenol or alcohol adducts are commercially available. The octylphenol-ethylene oxide adducts are available from Rohm and Haas (Triton X series), the nonylphenolethylene oxide adducts are available from Jefferson Chemical Company (Surfonic N. series) and the linear lauryl alcohol-ethylene oxide adducts are available from Continental Chemical Company (Alfonic series).

The preferred nonionic surfactants are effective in the compositions of this invention at most concentrations, e.g. at about 0.1–6.0 weight percent and preferably about 0.2 to about 5.0 weight percent of the composition.

In addition to the polymer component, the compositions of this invention will include a mixture of dimethyl ether and a volatile liquid organic compound having a vapor pressure of at least about 2 p.s.i.a. at about 20° C. The weight ratio of the dimethyl ether to the liquid organic compound is selected such that the foam is stable in the sense that it does not unduly collapse on standing, and so that the volume of the foam produced is not greater than about six times the volume of the dispensed emulsion of this invention prior to foaming.

Dimethyl ether is a commercially available liquifiable gas having a boiling point of $-23°$ C. at one atmosphere and is soluble in water to the extent of about 35 percent by weight at 24° C. at about 5 atmospheres. In the compositions of this invention, the amount of DME is preferably less than the amount of water present, most preferably the DME is present at 2.0–10 weight percent of the entire composition, but may be present in an amount up to the limit of solubility of DME at the pressure of the system.

The volatile organic liquid compound should be insoluble in water and inert, i.e., not react, complex or otherwise interfere with the other components of the composition. The particular organic liquid employed will depend upon the particular desired end use. In applications where it is desirable that a foam be generated after the composition is applied to a surface, volatile liquids having a relatively low vapor pressure, say 2 to 15 p.s.i.a., are preferably incorporated. Illustrative of such compounds are hydrocarbons having from about three to about eight carbon atoms, and halogenated hydrocarbons having up to five carbon atoms. Examples of such suitable volatile organic liquid compounds are hydrocarbons such as propane, n-butane, isobutane, hexane, n-pentane, 2-methylbutane, n-heptane, 1-pentene, 2-methyl-2-2-butene, cyclobutane, cyclopentane, cyclohexane, and mixtures thereof and halogenated hydrocarbons such as trichlorofluoromethane, carbon tetrachloride, trichloromethane, dichloromethane, 1,1,1-trichloroethane, 1,1- or 1,2-dichloroethane, ethyl bromide, 1 or 2-chloropropene, 1 or 2-bromopropane, 1- or 2-chloropropane, trichlorotrifluoroethane, dichlorodifluoroethane, octafluorocyclobutane, dichlorotetrafluoroethane, chlorotrifluoroethylene and mixtures thereof. Preferred organic liquid compounds for use in the composition of this inventions are hydrocarbons such as n-hexane, isobutane, n-butane, n-pentane and the like, and the volatile organic liquids may be present in the amount of about 0.2–1.0 weight percent of the composition.

The ratio of the weight percent of DME to the weight percent of liquid organic compound should be adjusted such that the foam is stable and does not unduly collapse on standing. The volume of the foam should not be greater than about six times the volume of the composition from which the foam is prepared. Generally these objectives are achieved when the weight ratio of DME to liquid organic compound is within the range of from about 8 to 1.0 to about 90 to 1.0. Preferably, the weight ratio of DME to the volatile organic compound will be from about 28 to 1.0 to about 45 to 1.0.

The compositions of this invention will include a foam forming amount of the mixture of the volatile organic liquid hydrocarbon and DME. That is, an amount of these ingredients sufficient to produce the desired cellular structure in the dispensed foam. In the embodiment of this invention where the composition is packaged in an aerosol type container, the amount of the DME and the volatile organic liquid mixture is sufficient to expel the composition from the aerosol container. These characteristics are achieved when the mixture is used in an amount of from about 3.0 to about 15% by weight, and preferably from about 3.5 to about 7% by weight based on the total weight of the composition. The precise amount of the mixture used will often depend upon the viscosity of the composition, the vapor pressure of the liquid, and the type of foam desired and other factors which are well known to those of skill in the relevant art. Generally, larger amounts of the mixture are employed when foams of lower density are desired. Smaller amounts of the mixture are used to produce firmer, denser foams. The combination of large amounts of the mixture together with low solids contents in the emulsified composition produces foams having open pores and a random pattern of voids. A high solids content coupled with low levels of the propellent mixture result in foams having a uniform cell structure of predominantly closed cells.

Fillers such as carbon black, silica, asbestos, powder chalk, heavy spar, blancfixe, titanium dioxide, quartz powder, zinc oxide, talc, kaolin, calcium carbonate and the like are examples of inorganic fillers which can be employed in the compositions of this invention. Preferably, the fillers will be present so as to make up 15–60% by weight of the total composition, most preferably 40–55% by weight.

Conceptually, when the emulsified compositions of this invention are expelled from a pressurized container, the rapid escape of the DME component provides for partial collapse or self-leveling of the foam. The slower escape of the hydrocarbon from the foam cells promotes the formation of a stable cellular foam of the preferred volume to volume ratio to the unfoamed composition.

In addition to the polymer emulsion component, the mixture of a volatile organic liquid compound and the DME, and the filler the compositions of this invention may include minor amounts of optional ingredients for various purposes. Such optional ingredients include those conventional additives which are used by those of skill in the art of polymer compositions, such as defoaming agents, cell modifiers, and foam structuring agents, including fatty acids, fatty alcohols, and the like which can be included for the purpose of modifying the structure of the foam. Other conventional additives including dyes or pigments, conventional solubilizers, fragrances, plasticizers and drying aids for the polymer can also be used. Thickeners such as carboxymethyl cellulose can be employed to control the viscosity of the composition and the resulting foam structure.

When using such fillers it is desirable to employ a dispersant such as potassium hexametaphosphate, ammonium polyacrylate or ammonium pyrophosphate to disperse the filler and to prevent sedimentation of the filler in the composition. The composition of this invention may also include compatible polyhydric alcohols such as ethylene glycol and propyopylene glycol to improve the freeze thaw stability and application characteristics of the composition. Various additives other than those set forth above are known to those of skill in the art, and these additives can be used to vary the properties of the foams prepared from the compositions of this invention. Generally, the polymer solids content plus the solids contributed by the filler and the optional ingredients present in the compositions of this invention will be within the weight percentage range of 70–85% of the total composition.

The compositions of this invention are compatible with various convenient packaging techniques. The compositions of this invention are packaged in pressurized containers at about 20–40 p.s.i.g. (i.e. conventional aerosol can pressures) in which case part of the mixture of volatile organic liquid and DME which was previously described can be used as the propellent to expel the compositions from the container.

The compositions of the present invention can be packaged in any conventional container for pressurized materials, including metal cans, glass bottles, reinforced plastic containers and like containers of any desired size. These containers will usually be fitted with valve and dispensing assemblies suitable for the production of foam, as for example, narrow or wide discharge foam heads or actuators designed to produce the foam on impingement. The containers may also be fitted with dip tubes, with a flexible dispensing tube attached to the outlet of the discharge orifice of the foam head, or provided with other assemblies which enable the use of the container in an inverted position.

The compositions of this invention are suitable for a variety of uses. The foams produced from the compositions generally reach a tack free state within a reasonably short time, for example, from about 1 to about 3 hours after application, and are, therefore, especially convenient for home application. The foams can be used to form insulating coatings on pipes, heaters and the like, or to prepare cushioning coatings for items that require protection during shipping. These foams are also useful as sealing coatings for porous surfaces such as masonary.

The compositions of this invention can be prepared and packaged according to conventional methods known to those of skill in the art. The compositions of this invention can be conveniently prepared merely by mixing the various ingredients in any order of addition. For example, the compositions of this invention can be conveniently prepared and packaged in a pressurized aerosol container in the manner described below.

An aqueous emulsion is prepared by adding the desired monomer in the desired amount of water, in the presence of a free radical initiator, thereby forming the polymeric emulsion. Next, surfactants and other desired optional ingredients are added in any order of addition to form a concentrate. The desired amount of the concentrate is then added to an aerosol container fitted with dispensing suitable for the production of foam. The air inside of the container evacuated by vacuum pump, and the volatile organic liquid compound and liquified DME are added either individually or in the form of a mixture. Within the container these propellants equilibrate between the aqueous and gaseous phase so as to form a pressurized gaseous phase sufficient to propel the composition from the container.

The foam prepared from the compositions of this invention is especially useful as caulking and insulating compositions because of its unique properties. Because the foam is stable and does not collapse on standing, the foam has only a slight tendency to shrink. Further, the low expansion ratios between the foam and the composition enable the user to deposit a narrow ribbon of the foam in a crevice, gap or the like which is being caulked or sealed. Further, because the form is dispensed under force of the gaseous propellent the size of the ribbon can be further decreased or increased merely by lessening or increasing the rate of flow from the discharge orifice. Lastly, because the form is soft and flowable when it is deposited under the impetus of the propellent mixture, the foam can be forced into narrow cracks and crevices and thereby assure a tight seal.

As has been explained previously, the concentrate viscosity, as well as the porosity, cell structure, tack-free time and application of the foam prepared from the compositions of this invention can be tailored to the needs of each of the aforementioned uses by a proper selection of the polymer composition, type of volatile organic compound, amount of DME, amount of volatile organic liquid, surfactant, filler and other additives.

The following specific examples are presented to more fully illustrate the preferred embodiments of this invention. In the examples, all weight percents are based on the total weight of the composition.

EXAMPLE I

A mixture was formed by mixing 1,000 grams of a 60% aqueous emulsion of a polymer of butyl acrylate monomer, having a glass transition temperature of −50° C. (LC-67, Rohm and Haas) and 2 grams of an adduct of about 70 moles of ethylene oxide per mole of octyl phenol having an HLB of about 18.8. To this mixture was added 2.4 g. of ammonium polyacrylate, 14.3 g. of ammonium pyrophosphate, 1190 g. of finely divided calcium carbonate, 4.75 g. of ethylene glycol and 2.4 g. of Nopco NXZ defoamer (Diamond Shamrock). The ingredients were mixed well to form a concentrate having a viscosity of 16,000 cps.

To an aerosol container fitted with a standard foam head was added 300 grams of the concentrate. The air was then evacuated from the container. The container was then pressurized sequentially with 4 grams of isobutane and 44.4 grams of dimethyl ether which respectively represented 0.6 and 5.6 weight percent of the composition in the container.

The foam head was activated, and the composition was expelled from the container by force of the mixture of DME and isobutane to form a white foam which had a smooth surface, and which dried to the touch quickly. The volume to volume ratio of foam to unfoamed composition was less than six.

This foam and the other foams produced by the compositions of Examples 2-19 were tested for water resistance, self-leveling and vertical cling.

The purpose of the water resistance test is to determine the wet adhesive properties of the composition. In this test, a 0.25 inch bead of the foam is dispensed from an aerosol container onto a glass surface. After the bead has dried, it and the glass are immersed in 20° C. water for a period of three days. If the bead adheres to the surface throughout the immersion period, it passes this test.

The self-leveling test determines the ability of the foam to partially collapse during drying to form a surface which is substantially even and free of pock marks. A 0.25 inch bead is dispensed from an aerosol container onto a vertically or horizontally placed paper surface. The bead is allowed to dry, and examined to determine if the surface is smooth and even, without indications of the underlying cellular structure.

The purpose of the vertical cling test is to determine the degree to which the foam slumps on drying. In this test, a 0.25 inch bead is dispensed onto a vertical surface. The bead is allowed to dry while in the vertical position. After drying, the bead is examined for vertical movement. The aforementioned properties are critical and are determinative of the ultimate utility of a foam caulking composition.

The viscosity of the concentrate was measured by using a Brookfield viscosimeter, equipped with a No. 6 spindle, at 20 rpm. Concentrates which passed the viscosity test were expelled essentially totally from the container when formulated and loaded by the procedures of Example I. Concentrates which failed the viscosity test tended to cavitate within the container, an effect which resulted in no, or greatly retarded expulsion of the foam.

The results of testing the foams prepared from compositions prepared by the general method of Example I in which the surfactant was varied are summarized in Table I. The results of the water resistance, self-leveling, vertical cling and viscosity tests are expressed as either pass (P) or fail (F).

TABLE I

| | | FOAM CAULKING COMPOSITIONS | | | | | | |
|---|---|---|---|---|---|---|---|---|
| Example | Surfactant Class | Moles ethylene oxide/Moles phenol or alcohol | HLB Value | Concentrate Viscosity (cps) | Viscosity Test | Vertical Cling | Self-Leveling | Water-Resistance |
| 1 | Octylphenol-ethylene oxide adduct | 70 | 18.8 | 16,000 | P | P | P | P |
| 2 | Octylphenol-ethylene oxide adduct | 40 | 18.1 | 15,000 | P | P | P | P |
| 3 | Octylphenol-ethylene oxide adduct | 15 | 16.0 | 16,000 | P | P | P | P |
| 4 | Octylphenol-ethylene oxide | 10 | 14.0 | 75,000 | F | | | |

TABLE I-continued
FOAM CAULKING COMPOSITIONS

| Example | Surfactant Class | Moles ethylene oxide/Moles phenol or alcohol | HLB Value | Concentrate Viscosity (cps) | Viscosity Test | Vertical Cling | Self-Leveling | Water-Resistance |
|---|---|---|---|---|---|---|---|---|
| 5 | Octylphenol-ethylene oxide adduct | 5 | 10.8 | 65,000 | F | | | |
| 6 | Nonylphenol-ethylene oxide adduct | 70 | 18.7 | 15,250 | P | P | P | P |
| 7 | Nonylphenol-ethylene oxide adduct | 40 | 17.9 | 15,000 | P | P | P | P |
| 8 | Nonylphenol-ethylene oxide adduct | 15 | 15.3 | 17,000 | P | P | P | P |
| 9 | Nonylphenol-ethylene oxide adduct | 10 | 13.5 | 80,000 | F | | | |
| 10 | Nonylphenol-ethylene oxide adduct | 5 | 10.2 | 75,000 | F | | | |
| 11 | Laurylalcohol-ethylene oxide adduct | 70 | 18.9 | 14,250 | P | P | P | P |
| 12 | Laurylalcohol-ethylene oxide adduct | 40 | 18.3 | 14,500 | P | P | P | P |
| 13 | Laurylalcohol-ethylene oxide adduct | 15 | 16.0 | 16,000 | P | P | P | P |
| 14 | Laurylalcohol-ethylene oxide adduct | 10 | 14.5 | 80,000 | F | | | |
| 15 | Laurylalcohol-ethylene oxide adduct | 5 | 11.3 | 79,250 | F | | | |
| 16 | Sodium Lauryl Sulfate | — | 40 | 100,000 | F | | | |
| 17 | Sodium Lauryl Ether Sulfate | — | 45 | 120,000 | F | | | |
| 18 | Triethanol Amine Oleate | — | 12 | 115,000 | F | | | |
| 19 | Potassium Oleate | — | 20 | 110,000 | F | | | |

From the results set forth in Table I, it can be observed from compositions containing the nonionic surfactants of Examples 1–3, 6–8 and 11–13 are effective in providing concentrates with viscosities within the range of 14,000 to 17,000 cps. Foams produced upon propellant expulsion of the concentrates passed the viscosity, vertical cling, self-leveling and water resistance tests. The nonionic surfactants employed in these Examples have HLB values in the range of about 15.0–19.8 but it is expected that nonionic surfactants with HLB values of greater than 19.0 would also provide concentrates having viscosities within the preferred range of 12,000 to 20,000 cps which would also yield foams which would pass the vertical cling, self-leveling and water-resistance tests.

All of the anionic surfactants used (Exs. 16–19) provided compositions which provided unsatisfactory viscosities, in that no expulsion of foam was evidenced. The compositions of Examples 4–5, 9–10 and 14–15 could be partially expelled from the containers, with discontinuous expulsion characteristics.

Thus, it has been demonstrated that DME-propelled polymeric oil-in-water emulsions provide useful compositions for foam insulating and caulking when a nonionic surfactant having an HLB value greater than about 15 is incorporated into the compositions.

While certain representative embodiments of the present invention have been shown for the purpose of more particularly illustrating the invention, it will be apparent to those skilled in the art that various changes and modifications may be made therein without departing from the scope and spirit of the invention.

What is claimed is:

1. A composition suitable for preparing a stable, cellular foam adapted to be dispensed from an aerosol container and maintained under pressure in a container having a value member associated with the container adaptable for continuous dispensing of the contents of the container, the composition comprising an aqueous emulsion of one or more foamable polymers, filler, a propellent amount of dimethyl ether and a volatile organic liquid compound selected from the group consisting of a volatile hydrocarbon, a volatile halogenated hydrocarbon, and mixtures thereof, wherein the foamable polymers have glass transition temperatures of less than about 15° C. and wherein the foamable polymers are emulsified by a nonionic surfactant having an HLB value of greater than about 15; wherein the ratio of the weight percent of the dimethyl ether to the organic liquid compound is about 9–90:1, and wherein the foam is self-leveling, water resistant, and the volume of the foam is not greater than about six times the volume of said composition.

2. The composition of claim 1 wherein the filler is calcium carbonate.

3. The composition of claim 1 wherein the polymer is of the acetate or acrylate type.

4. The composition of claim 3 wherein the polymer is polybutylacrylate.

5. The composition of claim 1 wherein the weight percent of the polymer is about 15–30%.

6. The composition of claim 1 wherein the weight percent of dimethyl ether is about 2–10%.

7. The composition of claim 1 wherein the volatile organic liquid compound is a hydrocarbon having from 2–7 carbon atoms.

8. The composition of claim 7 wherein the volatile organic liquid compound is a hydrocarbon selected from the group consisting of propane, n-butane, isobutane, n-pentane, 2-methylbutane, n-hexane, cyclopentane, cyclohexane and mixtures thereof.

9. The composition of claim 8 wherein the weight percent of the volatile organic liquid compond is from about 0.2–1.0 percent based on the total weight of the composition.

10. The composition of claim 1 wherein the ratio of the dimethyl ether to the volatile organic liquid compound is about 28–45:1.

11. The composition of claim 1 wherein the weight percent of total solids is about 70–85 percent.

12. The composition of claim 1 wherein the nonionic surfactant is a condensate of a multiplicity of ethanoloxy groups with an aliphatic or alkaryl alcohol.

13. The composition of claim 12 wherein the nonionic surfactant is a condensate of at least 15 moles of ethylene oxide per mole of lauryl alcohol, nonylphenol or octylphenol.

14. The composition of claim 13 wherein the nonionic surfactant is a condensate of from about 15–70 moles of ethylene oxide per mole of lauryl alcohol, nonylphenol or octylphenol.

15. The composition of claim 2 wherein said emulsion comprises about 15 to about 30 parts by weight of polymer, about 0.1 to about 5 percent by weight of nonionic surfactant, about 40–55 percent by weight of calcium carbonate, and about 3–15 percent by weight of a mixture of dimethyl ether and a volatile hydrocarbon.

16. An aerosol container containing therein a dispensable composition comprising one or more foamable polymers having glass transition temperatures of less than about 15° C. emulsified in an aqueous solution of dimethyl ether, wherein said polymers are emulsified by a nonionic surfactant having an HLB value of at least about 15; filler, and dispersed in said emulsion a volatile organic liquid compound selected from the group consisting of a volatile hydrocarbon, a volatile halogenated hydrocarbon, and mixtures thereof, wherein the ratio of the weight percent of the dimethyl ether to the organic liquid compound is about 8–90:1, and said composition being under dimethyl ether and organic liquid gas propellant pressure in said dispenser sufficient to propel said composition from said dispenser and to foam said composition to form a self-levelling, water-resistant foam having a volume not greater than six times the volume of said composition.

17. The aerosol container according to claim 16 wherein said organic liquid compound is a hydrocarbon having at least two carbon atoms.

18. The aerosol container according to claim 17 wherein said organic liquid compound is a hydrocarbon having from two to seven carbon atoms.

19. The aerosol container according to claim 17 wherein said organic liquid compound is a hydrocarbon selected from the group consisting of propane, n-butane, isobutane, n-pentane, 2-methylbutane, n-hexane, cyclopentane, cyclohexane and mixtures thereof.

20. The aerosol container according to claim 19 wherein one or more of said polymers have a mean glass transition temperature of less than $-10°$ C.

21. The aerosol container according to claim 20 wherein said polymer is a homopolymer or a copolymer of ethylenically unsaturated monomers.

22. The aerosol container according to claim 21 wherein said polymer is an acrylic polymer.

23. The aerosol container according to claim 22 wherein said polymers are homopolymers of monomers selected from the group consisting of acrylic acid, methacrylic acid and alkyl esters of acrylic or methacrylic acids, wherein the alkyl moieties include from one to seven carbon atoms.

24. The aerosol container according to claims 21 or 22 comprising from about 35 to about 50 weight percent of an aqueous polymeric emulsion based on the total weight of the composition, wherein said composition has a polymer solids content of from about 15–30 weight percent based on the total weight of the composition.

25. The aerosol container according to claim 18 wherein the weight percent of a said volatile organic liquid compound is from about 0.2 to about 1.0 weight percent based on the total weight of said composition.

26. The aerosol container according to claim 16 wherein the weight of said dimethyl ether is from about 2 to about 10 weight percent based on the total weight of the composition.

27. The aerosol container according to claim 16 wherein the filler is calcium carbonate.

28. The composition according to claims 1, 3, 4 or 15 wherein the viscosity of said emulsion is from about 12,000 to about 20,000 cps.

29. The composition according to claims 1, 3, 4 or 15 wherein the HLB of said nonionic surfactant is from about 15.0 to about 19.8 and the viscosity of said emulsion is within the range of about 14,000 to about 17,000 cps.

30. The aerosol container according to claims 16, 20 or 24 wherein the viscosity of said emulsion is from about 12,000 to about 20,000 cps.

31. The aerosol container according to claims 16, 20 or 24 wherein the HLB of said nonionic surfactant is from about 14,000 to about 17,000 cps.

32. The aerosol container according to claim 31 wherein the foamable polymer is polybutyl acrylate having a glass transition temperature of about $-50°$ C.

33. The aerosol container according to claim 19 wherein said nonionic surfactant is a condensate of from about 15 to about 70 moles of ethylene oxide per mole of lauryl alcohol, nonylphenol or octylphenol.

* * * * *